UNITED STATES PATENT OFFICE.

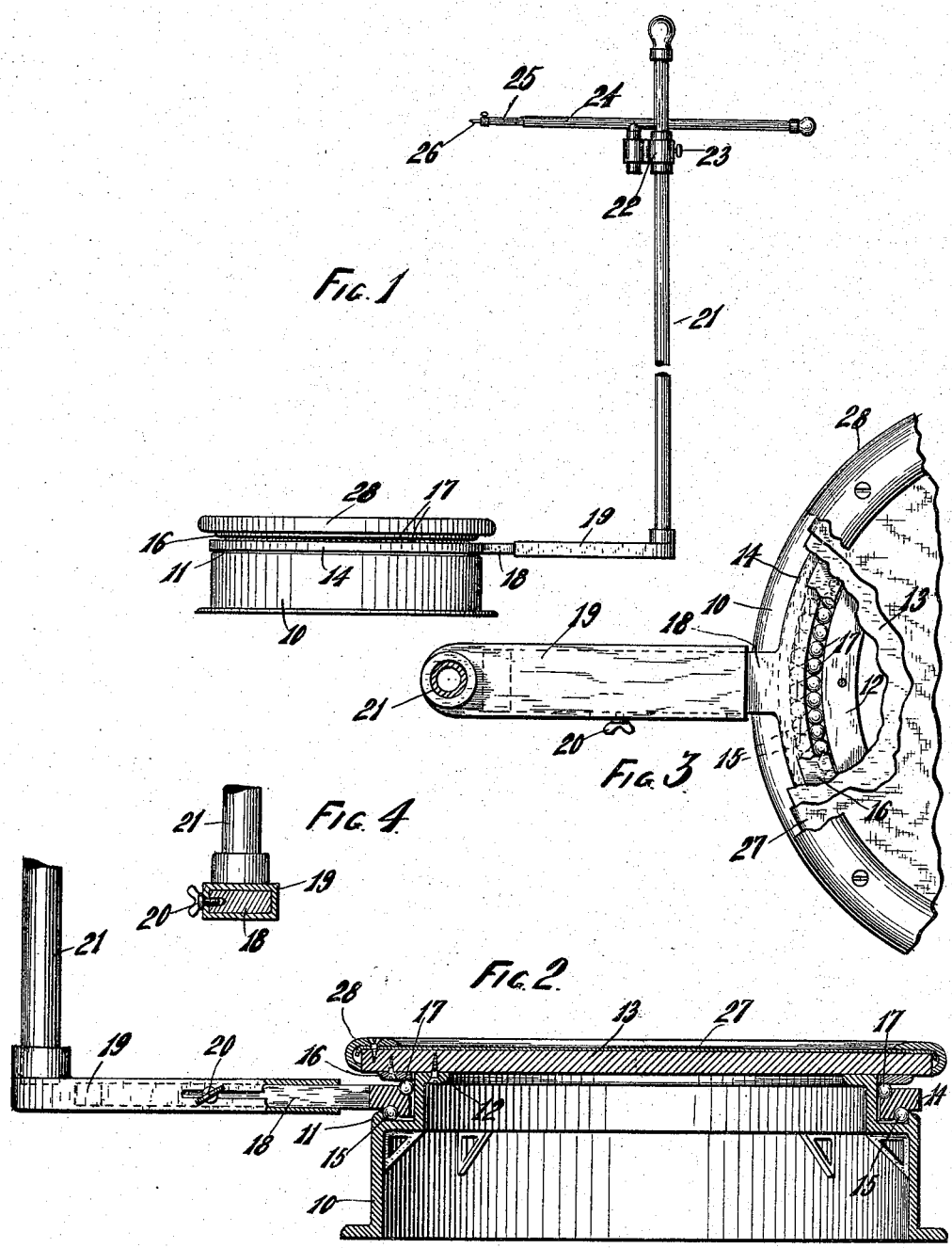

HENRY ESCH, JR., OF MANITOWOC, WISCONSIN.

MARKER FOR SKIRTS.

1,191,168.  Specification of Letters Patent.  Patented July 18, 1916.

Application filed May 24, 1915. Serial No. 29,956.

*To all whom it may concern:*

Be it known that I, HENRY ESCH, Jr., a citizen of the United States, and resident of Manitowoc, in the county of Manitowoc and State of Wisconsin, have invented new and useful Improvements in Markers for Skirts, of which the following is a description, reference being had to the accompanying drawings, which are a part of this specification.

This invention has for its object to provide means for quickly and easily tracing a line or mark entirely around a lady's skirt at the same distance from the floor throughout, though following the folds of the skirt to assist in properly leveling the hem.

Another object of the invention is to provide such a skirt marker with adjustability to enable the mark to be made at any desired height from the level of the floor.

Another object of the invention is to perfect details of construction, and to protect the bearing for the movable marking means, and to improve generally upon the skirt marker covered by my allowed application for Letters Patent Serial No. 804,814, filed December 5th, 1913.

With the above and other objects in view the invention consists in the marker for skirts as herein claimed and all equivalents.

Referring to the accompanying drawings, in which like characters of reference indicate the same parts in the different views, Figure 1 is a side elevation of a skirt marker constructed in accordance with this invention; Fig. 2 is a transverse sectional view thereof; Fig. 3 is a plan view of a portion thereof with parts of the platform broken away to show the construction of the bearing; and Fig. 4 is a transverse sectional view through the adjustable radial arm carrying the standard.

In these drawings 10 indicates a cylindrical base having a recess or rabbet entirely around its upper edge to form a bearing shoulder which is provided with an annular upstanding bearing flange 11, while the upper edge of the base extends inwardly to form a horizontal annular flange 12 to which a disk-shaped platform 13 may be secured as by screws passing through the flange into the platform as shown. A ring 14 is contained within the recess between the flanged shoulder of the base and the projecting edge of the platform and is provided at its outer lower edge with an annular groove forming a ball-race with the shoulder and its flange containing a series of balls 15 to form a lower ball bearing for the ring, while a similar groove at the upper inner edge of the ring forms a ball-race with the reduced portion of the base at its inner wall and a bearing ring 15 secured to the bottom of the overhanging edge of the platform 13 as its upper wall and in this ball-race is contained a series of balls 17. The ring 14 is thus provided with a lower ball bearing and an upper ball bearing so that it is perfectly free to turn without hindrance.

The telescoping adjustable radial arm is carried by the ring 14 and consists of a radial stem member 18 formed integral with the ring and preferably rectangular in cross section, as shown, and having a correspondingly shaped tubular sleeve 19 slidably mounted thereon and held in its adjustments by means of a thumb screw 20 passing through a longitudinal slot in the sleeve and threaded into the stem. At the end of the stem is a socket carrying a vertical standard 21 forming a guide for a sleeve or runner 22 which may be held at any desired elevation by a set screw 23 and which carries a socket in which is pivotally mounted the stem of a horizontal tubular guide arm 24. A marking rod 25 telescopes within the guide arm 24 and has a clamp at its end for holding a piece of chalk or other marking material to trace a line around the skirt of a person standing on the platform 10 when the ring is turned.

In operation the sleeve 22 is adjusted on the standard 16 to bring the chalk to the desired elevation, which may be either the distance from the base at which it is desired to have the skirt hang, or any other desired elevation from which the hem is to be measured, and then by turning the ring 14 by pushing the standard 16 around the base and by swinging the guide arm 21 to keep the chalk in contact with the garment the chalk is caused to trace a line around the skirt following the folds thereof, which line will lie entirely within a horizontal plane.

If desired, the platform may be provided with a covering 27 of carpet or other desirable material, and a neat and finished appearance is produced by surrounding the edge of the platform with a flanged bead ring 28 inclosing the edge of the covering 27.

The present construction has the bearing for the traveling ring fully protected by the projecting edges of the platform against obstruction by pieces of cloth or other material becoming entangled therein, and there is no danger of the garment material becoming soiled by coming in contact therewith, and while the device is readily assembled and is inexpensively constructed it is strong and durable and there is no liability of the ring getting out of place, as it is firmly held between upper and lower bearings. The adjustability of the telescoping radial arm carrying the standard enables the standard to travel in a circle of greater or less diameter according to whether the person being fitted is stout or slender, and permitting the guide arm 24 to maintain an approximately radial position with the telescoping of the marking rod 25 enabling the chalk to follow the recesses of the folds.

What I claim as new and desire to secure by Letters Patent is:

1. A marker for skirts, comprising a cylindrical base having an annular rabbet around its upper edge forming a bearing shoulder, an upstanding flange around the shoulder, a ring fitting within the annular rabbet and having a groove at its lower outer edge forming a ball-race with the shoulder and its flange, a series of balls contained in the ball-race, a platform secured to the base, there being a ball-race formed between the inner upper edge of the ring, the wall of the rabbet and the bottom of the platform, a series of balls contained therein, a standard carried by the ring, and a marking means adjustably mounted thereon.

2. A marker for skirts, comprising a cylindrical base having a rabbet around its upper edge forming a bearing shoulder, an upstanding flange around the bearing shoulder, a ring fitting within the rabbet and having a groove at its lower outer edge forming a ball-race with the shoulder and the flange, a series of balls within the ball-race, an inwardly extending flange around the upper edge of the rabbet, a platform secured thereto and projecting over the base, a bearing ring secured to the under side of the projecting edge of the platform, there being a groove in the upper inner edge of the ring forming a ball-race with the wall of the rabbet and the bearing ring, a series of balls therein, a standard carried by the ring, and a marking device adjustably mounted thereon.

In testimony whereof, I affix my signature, in presence of two witnesses.

HENRY ESCH, Jr.

Witnesses:
HENRY GROTH,
CHARLES G. HACKET.

Copies of this patent may be obtained for five cents each, by addressing the "Commissioner of Patents, Washington, D. C."